(12) United States Patent
McCorkle et al.

(10) Patent No.: US 7,782,925 B2
(45) Date of Patent: Aug. 24, 2010

(54) METHOD AND DEVICE FOR GENERATING HIGH FREQUENCY WAVEFORMS

(75) Inventors: John W. McCorkle, Vienna, VA (US); Phuong T. Huynh, Annandale, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1340 days.

(21) Appl. No.: 11/215,305

(22) Filed: Aug. 31, 2005

(65) Prior Publication Data
US 2007/0047627 A1    Mar. 1, 2007

(51) Int. Cl.
*H04B 1/00*    (2006.01)
(52) U.S. Cl. .............. 375/146; 375/135; 375/140; 375/260; 375/295; 375/354; 455/91
(58) Field of Classification Search .............. 375/135, 375/140, 146, 260, 295, 354; 455/91
See application file for complete search history.

(56) References Cited

U.S. PATENT DOCUMENTS 7,177,341 B2 *   2/2007   McCorkle ............... 375/130
7,224,711 B2 *   5/2007   Johnson et al. .......... 375/130
2005/0068932 A1 *   3/2005   Lakkis ................... 370/347
2005/0185669 A1 *   8/2005   Welborn et al. ......... 370/465

OTHER PUBLICATIONS

John McCorkle "Ultra Wide Bandwidth (UWB): Gigabit Wireless Communications for Battery Operated Consumer Applications", IEEE Jun. 2005.*

* cited by examiner

*Primary Examiner*—David C Payne
*Assistant Examiner*—Leon Flores (57) ABSTRACT

An ultra wideband direct sequence code division multiple access (UWB DS-CDMA) (101) transmitter is provided. It includes a first multiplier (125) receiving two input signals, where the input signals are selected from a multi-level code signal (117), a transmit data signal (123), and a radio frequency (RF) center frequency signal (121), and responsive to the two input signals, generating a combined signal (127). Further included is a network (119) receiving a code-clock signal (113) aligned with the multi-level signal (117), multiplying the frequency of the code-clock signal (113) by a factor, and responsive thereto, producing the RF center frequency signal (121). Also provided is a second multiplier (129) receiving the combined signal (127) and the other of the input signals (117, 123, 121), and responsive thereto, generating an output signal (131).

19 Claims, 5 Drawing Sheets

METHOD AND DEVICE FOR GENERATING HIGH FREQUENCY WAVEFORMS

FIELD OF THE INVENTION

The present invention relates in general to transmitters, and more specifically to transmitters and communication devices for generating high frequency waveforms, and methods therefor.

BACKGROUND OF THE INVENTION

Consumers increasingly rely on digital resources provided by electronic devices such as cellular telephones, digital cameras, or portable and handheld digital electronic devices. The increased quality and speed of digital data is becoming increasingly attractive to an ever-expanding consumer market, as has become evident in applications for wireless networks, downloadable digital music, digital movies, etc. Such applications demand rapid transmission of data.

One approach to rapidly transmitting data is direct sequence spread spectrum, also known as direct sequence code division multiple access (DS-CDMA). DS-CDMA is utilized in connection with cellular telephones, digital cameras, portable and handheld digital electronic devices, and other devices where a rapid data transmission rate is desired.

DS-CDMA is an approach to spread spectrum modulation for digital signal transmission. In DS-CDMA, a stream of data to be transmitted is divided into small pieces, each of which is allocated across to a frequency channel across the spectrum to provide a data signal. At the point of transmission, the data signal is combined with a higher data-rate bit sequence (also known as a chipping code) that divides the data according to a spreading ratio and provides redundancy.

Improvements are sought to increase not only the data rate but also the quality of transmissions.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns wireless communications devices or units, often referred to as communication units, such as cellular phone or two-way radios and the like having a capability for rapidly transmitting data, such as can be associated with a communication system such as an Enterprise Network, a cellular Radio Access Network, or the like. Such communication systems may further provide services such as voice and data communications services. More particularly, various inventive concepts and principles are embodied in circuits, communication units, and methods therein for generating output signals to be transmitted in connection with a communication device.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed increase the speed and accuracy for a signal transmitted in accordance with ultra wideband direct sequence code division multiple access (UWB DS-CDMA).

Further in accordance with exemplary embodiments, there is provided a timing and waveform circuit, transmitter, method and device for generating high frequency waveforms, useful for, e.g., direct sequence code division multiple access (DS-CDMA).

Figure 1:
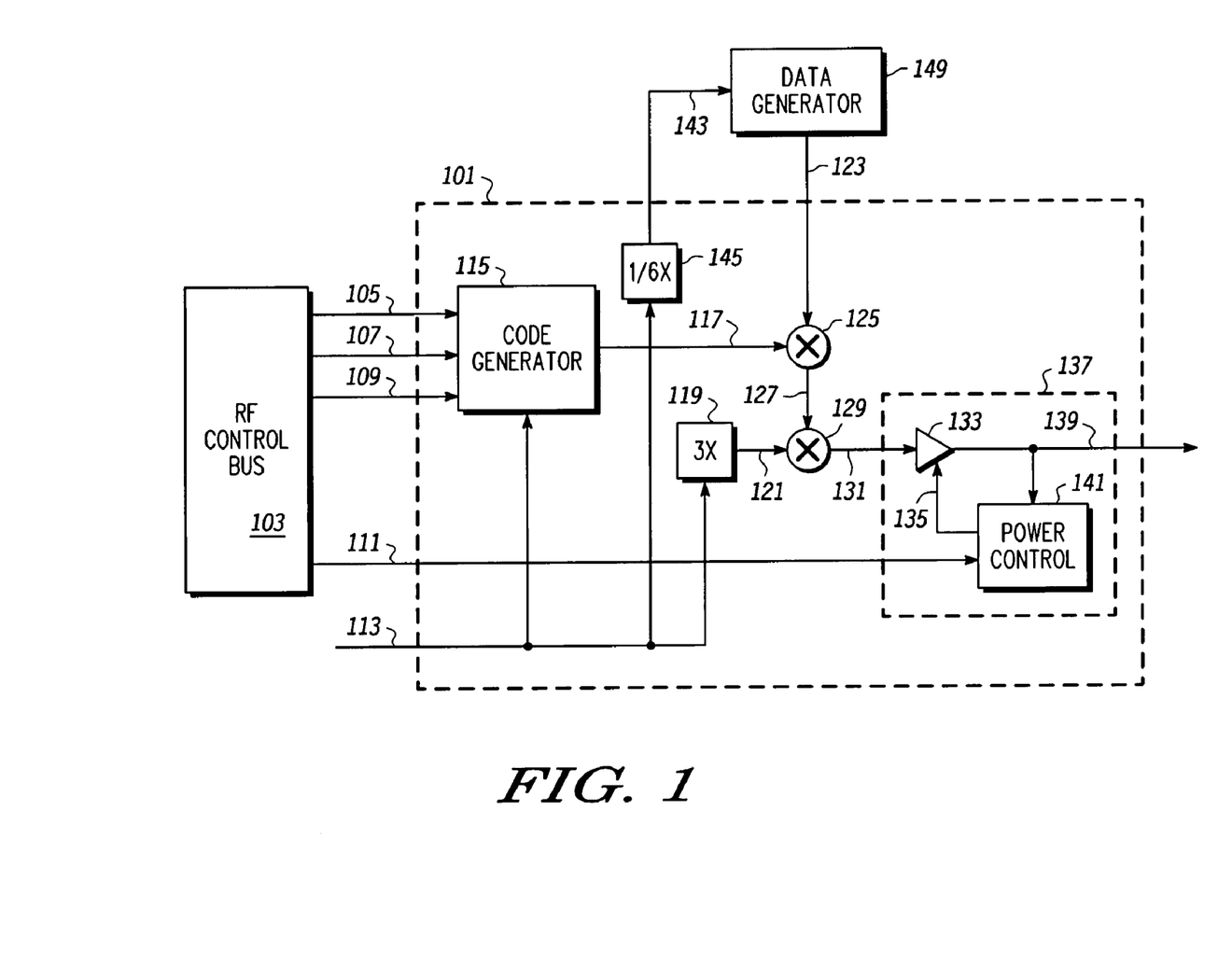
FIG. 1 is a diagram illustrating an example device in accordance with various exemplary embodiments.

Referring now to FIG. 1, a diagram illustrating an example device in accordance with various exemplary embodiments will be discussed and described. A transmitter 101 according to one or more embodiments can include a first multiplier 125, a second multiplier 129, and a network 119. One or more embodiments can provide a power control feedback loop 137, and/or a code generator 115. The power control feedback loop 137 is discussed in more detail in connection with FIG. 2.

A multi-level code signal 117, a transmit data signal 123, and a radio frequency (RF) center frequency signal 121 are provided. In the illustrated embodiment, the multi-level code signal 117 and the transmit data signal 123 are received by the first multiplier 125, which generates a combined signal 127; and the combined signal 127 and the RF center frequency signal 121 are received by the second multiplier 129, which generates an output signal 131. Thereby, the multi-level code signal 117, the transmit data signal 123, and the RF center frequency signal 121 are combined. The transmit data signal 123, the RF center frequency signal 121, and the multi-level code signal 117 can be multiplied in any order.

Accordingly, one or more embodiments provide a UWB DS-CDMA transmitter. The transmitter 101 can include a first multiplier 125 receiving two input signals, where the input signals are selected from a multi-level code signal 117, a transmit data signal 123, and a RF center frequency signal 121, and responsive to the two input signals, generating a combined signal 127. Also provided for is a network 119 receiving a code-clock signal 113 aligned with the multi-level signal 117, multiplying the frequency of the code-clock signal 113 by a factor, and responsive thereto, producing the RF center frequency signal 121. Further provide is a second multiplier 129 receiving the combined signal 127 and the other of the input signals, and responsive thereto, generating an output signal 131.

The multi-level code signal 117 can be a digital signal having a plurality of distinct amplitude level. For example, the multi-level code signal 117 can be binary (two level), ternary (three level), and/or n-ary (n level), where $n \geq 2$. An example of a multi-level code signal 117 is illustrated in connection with FIG. 8. Moreover, the multi-level signal 117 can be single-ended and/or differential.

The transmit data signal 123 can be a digital signal providing data that is to be transmitted. A rate of the transmit data can be controlled by a length of the code, e.g., 24, 12, 6, and/or 2. The transmit data signal 123 can be single-ended and/or differential, according to various embodiments.

The RF center frequency signal 121 can provide a clock signal in the form of a sine wave. Multiplying the information which is to be transmitted reflected in the multi-level code signal 117 by the sine wave can shift the spectrum of the multi-level code signal 117 to suit applicable standards, e.g., set by the Federal Communication Commission (FCC) or similar. This is discussed, for example, in connection with FIG. 7.

The network 119 can receive a code-clock signal 113. The code-clock signal 113 indicates the speed of arrival of the transmit data 123. The code-clock signal 113 can be aligned with the multi-level signal 117, for example by being utilized as a clock by a component producing the multi-level signal 117. The network 119 can multiply the frequency of the code-clock signal 113 by a factor to produce the RF center frequency signal 121. It is anticipated that the code-clock signal 113 can be 1300 Mhz, 1313 Mhz, 1326 Mhz, 1339 Mhz, 1352 Mhz, or the like, although alternatives may be provided in correspondence to an available code-clock signal. The factor can be n, where n is any real number. In the illustrated embodiment, the factor is three.

The network 119 can be provided in any way appropriate for receiving the code-clock signal 113 and outputting a sine wave. Appropriate components are known in the art and include, for example, a frequency locked loop, a delay lock loop, a phase-locked loop, and/or an injection-locked oscillator. Accordingly, the network 119 includes at least one of a frequency locked loop, a delay lock loop, a phase-locked loop, and an injection-locked oscillator.

One or more of the multipliers 125, 129 can be differential. Moreover, the multi-level code signal 117 and/or the combined signal 127 can be differential. Accordingly, one or more embodiments can provide that at least one of the first multiplier 125 and the second multiplier 129 is differential; and at least one of the multi-level code signal 117 and the combined signal 127 is differential. Moreover, one or more embodiments can provide that at least one of the multi-level code signal 117, the RF center frequency signal 121, the combined signal 127, and the output signal 131 is differential.

One or more embodiments can provide a second network 145, for providing a clock signal, e.g., a data-clock signal 143 to gate the data on the transmit data signal 123. Thereby the transmit data signal 123 can be aligned with the data-clock signal 143. In the illustrated example, the transmit data signal 123 is generated from a data generator 149, such as a conventional digital base band chip or similar. The data generator 149 receives the data-clock signal 143 and generates the transmit data signal 123 aligned with the data-clock signal 143. Accordingly, one or more embodiments further comprises a second network 145 receiving the code-clock signal 113, multiplying a frequency of the code-clock signal by a second factor, and responsive thereto, producing a data-clock signal 143 aligned with the transmit data signal 123. The code-clock signal 113 can be single ended or differential.

In the illustrated embodiment, the second factor utilized by the second network 145 is $\frac{1}{6}$. The second factor can be any real number. Alternative embodiments can provide that the second factor is one of $\frac{1}{2}$, $\frac{1}{3}$, $\frac{1}{4}$, $\frac{1}{6}$, $\frac{1}{12}$ and $\frac{1}{24}$.

One or more embodiments can provide the code generator 115 included in the transmitter 101, as in the illustrated embodiment. The code generator 115 can be a multi-level code generator, for generating the multi-level code signal 117. The code generator 115 can receive a chipping code signal 105 and a code mask signal 107, and generate the multi-level code signal 117 in response thereto. Accordingly, the device can further comprise a multi-level code generator, receiving a chipping code signal and a mask signal and responsive thereto, providing the multi-level code signal 117. The code-clock signal 113 can also be provided to the code generator 115.

An indication of the code length can be provided to the code generator 115 in accordance with various embodiments by, e.g., a code length select signal 109. The code length select signal 109 can indicate the code length, e.g., selected from 24, 12, 6 and/or 2. The code generator 115 can appropriate generate the multi-level code signal 117 based on the code length select signal 109, in addition to the chipping code signal 105 and code mask signal 107. Alternative embodiments can provide that the multi-level code signal 117 is received by the transmitter 101.

The chipping code signal 105 and the code mask signal 107 can be provided from a bus, e.g., a control bus, such as an RF control bus 103. The chipping code signal 105 and code mask signal 107 can be provided in accordance with conventional procedures which will not be detailed here, in order to avoid obscuring pertinent details.

The power control feedback loop 137 is optional. In the illustrated embodiment, the power control feedback loop 137 generally includes a first component 133 receiving the output signal 131 and receiving a power control feedback signal 135, and generating an adjusted output signal 139. Also included can be a power control component 141, receiving and accumulating the adjusted output signal 139, sensing the peak voltage therein, comparing the peak voltage with an accumulated reference voltage, and adjusting a waveform of the output signal 131 to provide the adjusted output signal 139. The power control feedback signal 135 and adjusted output signal 139 can be differential. The power control component 141 can be controlled from a power control signal 111, which can control a level of power to the power control feedback loop 137.

The power control signal 111 can be provided from, e.g., the RF control bus 103. Optionally, the RF control bus 103 can provide a transmit enable signal (not illustrated) to the transmitter 101, in order to enable and/or disable transmission.

Figure 2:
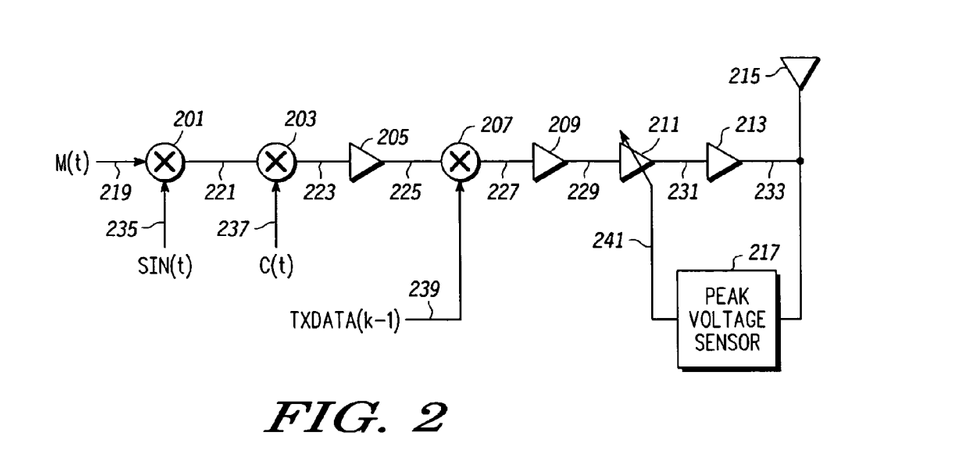
FIG. 2 is a circuit diagram illustrating a first portion of an example device in accordance with various exemplary embodiments.

Referring now to FIG. 2, a circuit diagram illustrating a first portion of an example device in accordance with various exemplary embodiments will be discussed and described. Illustrated herein is a portion of one or more embodiments of the transmitter, here encompassing a plurality of buffers and an optional power control feedback loop mentioned in connection with FIG. 1. Optional first and second buffers 205, 209 can decrease clock leakage, which tends to cause spectral lines to appear in the output signal.

A chipping code signal C(t) 237, transmit data signal TxData(k-1) 239, RF center frequency signal SIN(t) 235, and mask code signal M(t) 219 are combined in any order. In the exemplary illustration, the mask code signal M(t) 219 and the RF center frequency signal SIN(t) 235 are combined at a first multiplier 201 to generate a first combined signal 221. The first combined signal 221 and the chipping code signal C(t) 237 are combined at a second multiplier 203 to generate a second combined signal 223. The second combined signal 223 is combined with the transmit data signal TxData(k-1) 239 at a third multiplier 207 to produce a third combined signal 227.

Any of the first, second and/or third combined signals 221, 223, 227 optionally can be buffered, so that at least two buffers are provided. In the illustrated example, before the second combined signal 223 is combined with the transmit data signal TxData(k-1) 239, the second combined signal can be buffered at the first buffer 205 to produce a buffered second combined signal 225; and the third combined signal 227 can be buffered at the second buffer 209 to produce a fourth combined signal 229. The first and/or second buffers 205, 209 can be differential buffers. Additional buffers can be provided if desired.

Optionally, the third combined signal 229 can be utilized with a power control feedback loop. In the illustrated embodiment, the power control feedback loop includes a peak voltage sensor 217, a switched buffer 211, and a driver 213. The switched buffer 211 receives the fourth combined signal 229, generating a buffered signal 231. The buffered signal 231 is input to the driver 213, which produces an adjusted output signal 233 to be provided to a transmitter antenna 215. The adjusted output signal 233 is further provided to the peak voltage sensor 217. The peak voltage sensor 217 can compare the buffered signal with a reference voltage and increase or decrease an output wave form, so that the cumulative voltage approaches the reference voltage (over time). The reference voltage can be, for example, an expected voltage according to the relevant standard, such as FCC standards or similar. Accordingly, the peak voltage sensor 217 can provide an adjustment signal 241 to the switched buffer 211, thereby to adjust a waveform of the adjusted output signal 233.

Accordingly, one or more embodiments can comprise a power control feedback loop receiving the output signal, adjusting the magnitude of the output signal waveform, and outputting the adjusted output signal. The output signal can be provided from, e.g., the illustrated buffers 205, 209, such as fourth combined signal 229, or without having been buffered.

Figure 3:
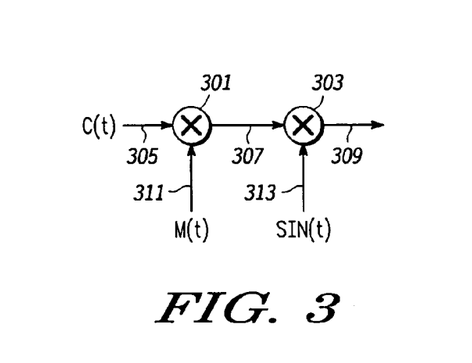
FIG. 3 is a circuit diagram illustrating a second portion of an example device in accordance with various alternative embodiments.
Figure 4:
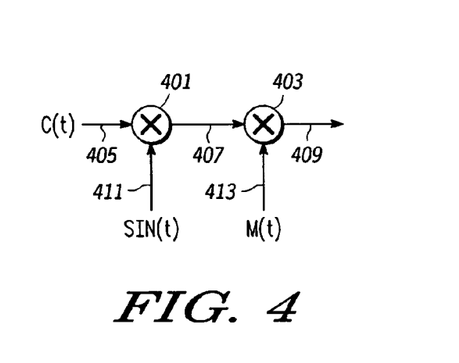
FIG. 4 is a circuit diagram illustrating the second portion of an example device in accordance with various other alternative embodiments.

FIG. 3 and FIG. 4 are circuit diagrams illustrating alternative ordering of the multipliers shown in the portion of the transmitter illustrated in FIG. 2. These diagrams illustrate alternative orders of receiving a chipping code signal C(t), an RF center frequency signal SIN(t), and mask code signal M(t), which can be combined in any order.

Referring now to FIG. 3, a circuit diagram illustrating a second portion of an example device in accordance with various alternative embodiments will be discussed and described. In the exemplary illustration, a mask code signal M(t) 311 and a chipping code signal C(t) 305 are combined at a first multiplier 301 to generate a first combined signal 307. The first combined signal 307 and an RF center frequency signal SIN(t) 313 are combined at a second multiplier 303 to generate a second combined signal 309. The transmit data signal (not illustrated) can also be combined in any order with the mask code signal 311, chipping code signal 305, and RF center frequency signal 313, e.g., via another multiplier or a network.

Referring now to FIG. 4, a circuit diagram illustrating the second portion of an example device in accordance with various other alternative embodiments will be discussed and described. In the exemplary illustration, an RF center frequency signal SIN(t) 411 and a chipping code signal C(t) 405 are combined at a first multiplier 401 to generate a first combined signal 407. The first combined signal 407 and a mask code signal M(t) 413 are combined at a second multiplier 403 to generate a second combined signal 409. As with other variations, the transmit data signal (not illustrated) can be combined in any order with the illustrated signals.

Accordingly, one or more embodiments provides for a first multiplier receiving two input signals, where the input signals are selected from a multi-level code signal, a transmit data signal, and a radio frequency (RF) center frequency signal, and responsive to the two input signals, generating a combined signal. Further, one or more embodiments provides a second multiplier receiving the combined signal and the other of the input signals.

Figure 5:
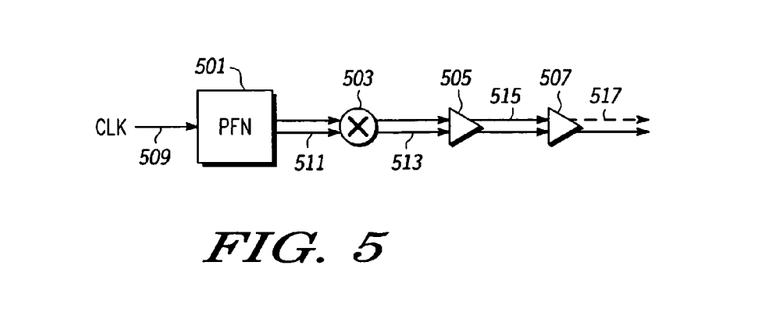
FIG. 5 is a circuit diagram illustrating a third portion of an example device in accordance with various alternative embodiments.

Referring now to FIG. 5, a circuit diagram illustrating a third portion of an example device in accordance with various alternative embodiments will be discussed and described. As illustrated, a transmitter can include a pulse forming network 501, a modulated chip 503, a post amplifier 505 and a driver 507. A clock signal 509 is provided to the pulse forming network 501, which generally encompasses components discussed in connection with FIG. 1.

The pulse forming network 501 can provide a first differential signal 511 to the modulated chip 503, which can provide a second differential signal 513 to the post amplifier 505. The second differential signal 513 still exhibits spectral lines. After buffering the second differential signal 513 at the power amplifier 505, a third differential signal 515 can be produced from the power amplifier 505, in which the spectral lines have been reduced. The third differential signal 515 can be provided to the driver 507, after which the spectral lines can be further reduced and a balanced output signal 517 can be produced. According to one or more embodiments, as illustrated, the driver 507 can produce the balanced output signal 517 as a single-ended signal, or as a differential signal.

Accordingly, one or more embodiments further comprises a multi-stage differential buffer having at least one stage in series receiving the output signal, and balancing the output signal to provide a balanced output signal 517. The multi-stage differential buffer can include two buffers 505, 507 as illustrated, or more than two buffers. According to one or more embodiments, the buffers can include at least one post amplifier 505 and/or at least one driver 507. The balanced output signal 517 can be single-ended and/or differential. One or more of the signals provided to, from and/or between at least one of the buffers can be single-ended and/or differential. For example, all of the signals between the buffers can be differential. Accordingly, a device further can comprise a multi-stage differential buffer having at least one stage in series receiving the UWB signal to reduce distortion therein.

Figure 6:
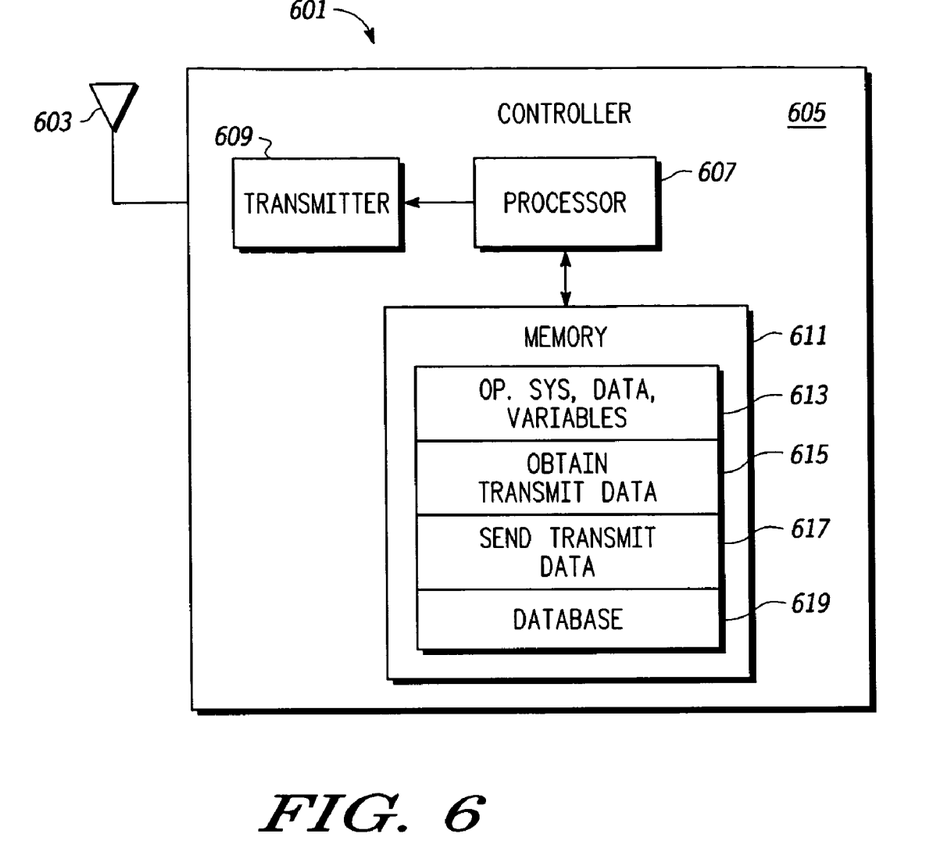
FIG. 6 is a functional block diagram illustrating portions of an exemplary communication device arranged for transmitting data in accordance with various exemplary embodiments.

Referring now to FIG. 6, a functional block diagram illustrating portions of an exemplary communication device arranged for transmitting data in accordance with various exemplary embodiments will be discussed and described. The communication device 601 may include a transceiver 603 and one or more controllers 605. A controller may include a processor 607, a memory 611, and transmitter 609 in-line with the processor 607 and transceiver 603. Many other components that can be included are well understood to those of skill, and are not discussed herein in order for the sake of simplicity.

The processor 607 may comprise one or more microprocessors and/or one or more digital signal processors. The memory 611 may be coupled to the processor 607 and may comprise a read-only memory (ROM), a random-access memory (RAM), a programmable ROM (PROM), and/or an electrically erasable read-only memory (EEPROM). The memory 611 may include multiple memory locations for storing, among other things, an operating system, data and variables 613 for programs executed by the processor 607; computer programs for causing the processor to operate in connection with various functions such as obtaining transmit data 615, sending transmit data 617, and/or other processing (not illustrated); and a database 619 of information used by the processor 607. The computer programs may be stored, for example, in ROM or PROM and may direct the processor 607 in controlling the operation of the communication device 601.

The processor 607 may be programmed for obtaining transmit data 615, where the data represents information that is to be transmitted, i.e. transmit data. The transmit data can be provided in accordance with well-known components, e.g., as output from an A/D converter, as input digital information, as output from a base band chip, or the like. The data that is received can be provided at the desired rate and bit-size, e.g., bit-by-bit.

The processor 607 may be programmed for sending the transmit data 617 that is to be transmitted. Once the transmit data base been obtained by the processor, it can be provided to the transmitter 609, e.g., in accordance with known techniques, or as further discussed herein.

Accordingly, one or more embodiments provide a communication device 601 for transmitting data. The communication device 601 comprises a processor 607. The processor 607 can be configured to facilitate providing 615, 617 a transmit data signal representative of data to be transmitted. The communication device 601 further can comprise a transmitter 609, cooperatively operable with the processor 607 and responsive to receipt of the transmit data signal. As discussed above, the transmitter 609 can include a network inputting a clock signal and multiplying a frequency of the clock signal by a factor, to produce a radio frequency (RF) center frequency signal. The transmitter 609 further can include a first multiplier receiving two input signals, where the input signals are selected from a multi-level code signal, the transmit data signal, and the RF center frequency signal, and responsive to the two input signals, generating a combined signal. The transmitter 609 further can include a second multiplier receiving the combined signal and the other of the input signals, and responsive thereto, generating an ultra wide band (UWB) signal to be transmitted as an output signal.

Figure 7:
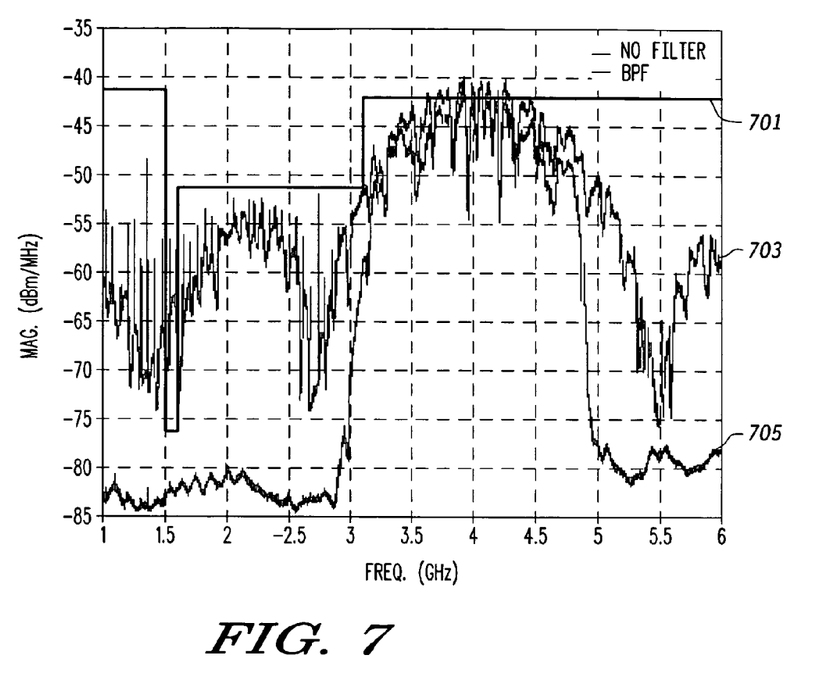
FIG. 7 illustrates an example of a signal wave form according to one or more embodiments.

Referring now to FIG. 7, an example of a signal wave form according to one or more embodiments will be discussed and described. FIG. 7 illustrates an example of a test measuring a signal wave form in accordance with one or more embodiments with no filter 703 and the same signal wave form with a filter 705, e.g., a band pass filter, in accordance with one or more embodiments. A filter was placed between a transmitter according to one or more embodiments and an antenna. A maximum acceptable amplitude 701 prescribed by an applicable standard, e.g., set by the Federal Communication Commission (FCC) or similar is also illustrated, for reference.

The filtered signal wave form 705 has been filtered to comply with FCC requirements. The signal wave form which has been differentially buffered can provide a balanced output signal, and which is received by the filter, has no spectral lines. (Spectral lines are generally outside the 3-5 GHz band.) The filtered signal wave form 705 of the output signal can be balanced particularly in comparison to the unfiltered signal wave form 703.

Figure 8:
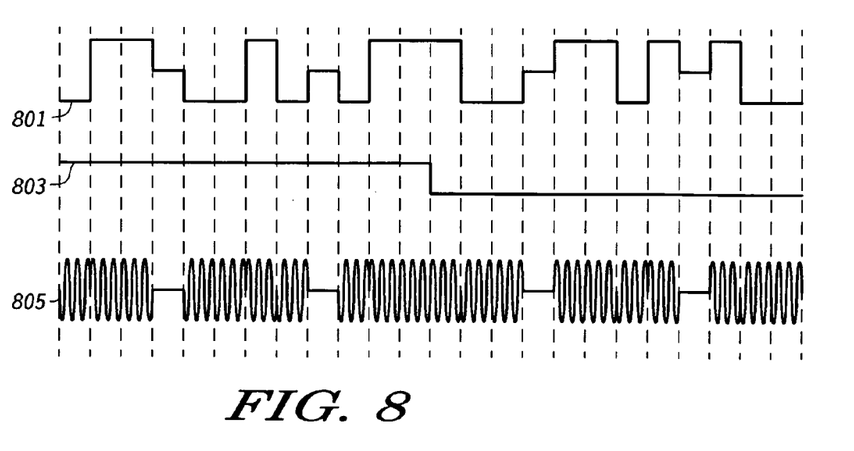
FIG. 8 is a timing diagram useful in illustrating an example operation of one or more embodiments.

Referring now to FIG. 8, a timing diagram useful in illustrating an example operation of one or more embodiments will be discussed and described. The timing diagram illustrates three waveform signals: a multi-level code signal 801, a transmit data signal 803, and a transmit waveform signal 805 (sent to a transmit antenna). In the illustrated example, the modulated signal is a 12-bit ternary code. One or more alternative embodiments can utilize other numbers of bits and/or other n-ary code.

The multi-level code signal 801 in this illustration is representative of ternary code, where the levels represent −1, 0 or 1. The transmit data signal 803 represents 12 bits of the multi-level code signal 801 which are transmitted. The transmit waveform signal 805 (sent to a transmit antenna) represents the multi-level code signal 801.

Accordingly, one or more embodiments provide that the multi-level code signal is a ternary signal.

Figure 9:
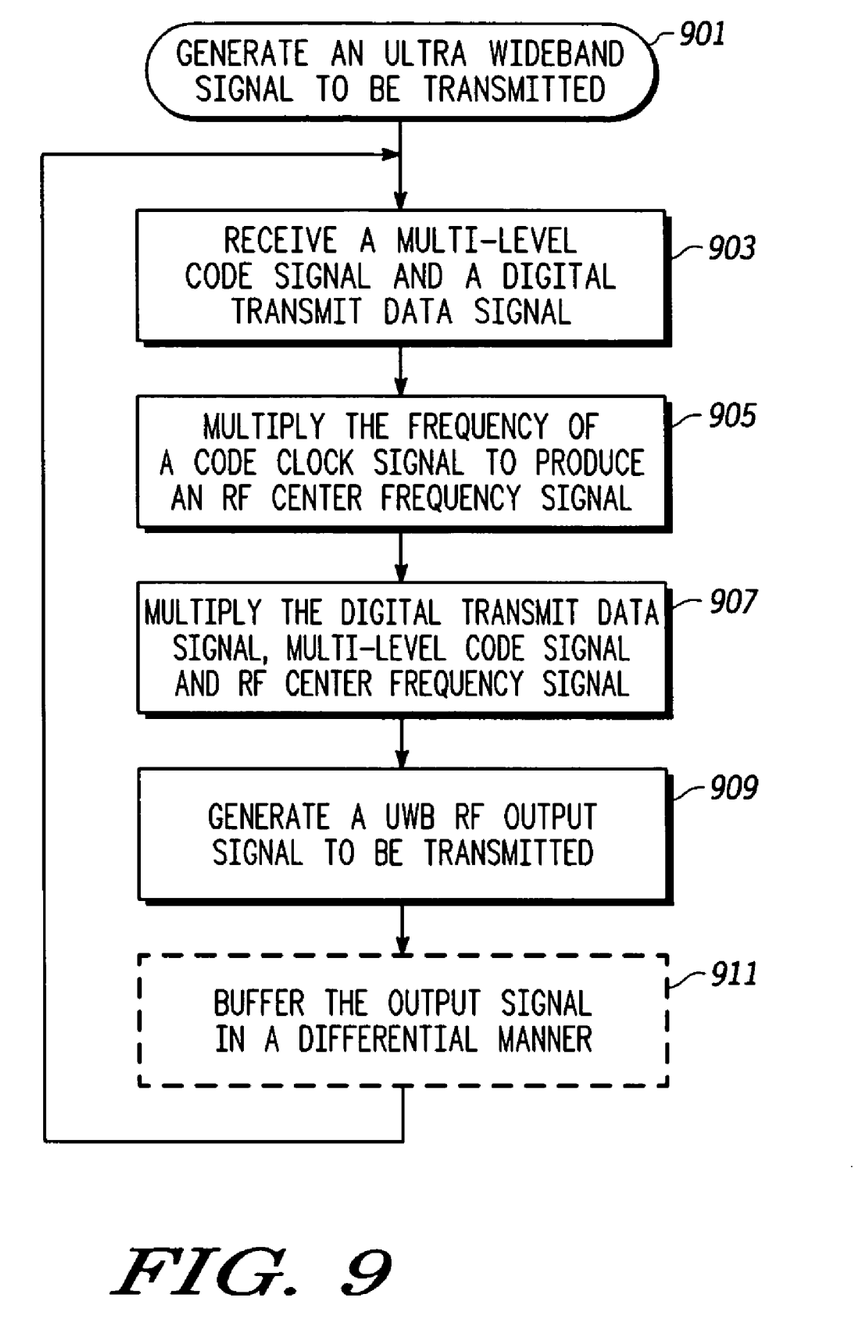
FIG. 9 is a flow chart illustrating an exemplary procedure for generating an ultra wideband signal to be transmitted, in accordance with various exemplary and alternative exemplary embodiments.

Referring now to FIG. 9, a flow chart illustrating an exemplary procedure 901 for generating an ultra wideband signal to be transmitted in accordance with various exemplary and alternative exemplary embodiments will be discussed and described. The procedure can advantageously be implemented on, for example, in a controller, described in connection with FIG. 6 or other apparatus appropriately arranged.

In overview, the procedure for generating an ultra wideband signal to be transmitted 901 includes receiving a multi-level code signal and a digital transmit data signal 903; multiplying the frequency of a code clock signal to produce an RF center frequency signal 905; multiplying the digital transmit data signal, the multi-level code signal and the RF center frequency signal 907; and generating a UWB RF output signal to be transmitted 909. Optionally, the process can include buffering the output signal in a differential manner 911. Each of the foregoing is discussed in more detail below.

The process can include receiving a multi-level code signal and a digital transmit data signal 903. The multi-level code signal can be provide, for example, from a code generator or RF control bus, as discussed in connection with FIG. 1. The digital transmit data signal can include information representative of data which is to be transmitted. The digital transmit data signal can be provide from, for example, a data generator, discussed for example in connection with FIG. 1.

The process can include multiplying the frequency of a code clock signal to produce an RF center frequency signal 905, and multiplying the digital transmit data signal, multi-level code signal and RF center frequency signal 907. The multiplying can be performed in any order, and/or in a plurality of multipliers and/or networks, or any combination thereof. In accordance with one or more embodiments, the code-clock signal can be aligned with transitions in the multi-level code signal.

The process can include generating a UWB RF output signal to be transmitted 909. The UWB RF output signal is generated from the combination of the digital transmit data signal, the multi-level code signal, and the RF center frequency signal discussed above. The UWB RF output signal can be further utilized in connection with a transmission of the signal, e.g., from a transmission antenna.

Optionally, the UWB RF output signal can be subjected to further processing before being provided, e.g., to a transmission antenna. For example, the process can include buffering the output signal in a differential manner 911. Illustrative examples of differential buffering are discussed more in detail in connection with FIG. 2 and FIG. 5.

Accordingly, one or more embodiments provide a method of generating 901 an ultra wideband (UWB) output signal to be transmitted. The method comprises receiving a multi-level code signal and a digital transmit data signal; multiplying a frequency of a code-clock signal by a factor to produce a radio frequency (RF) center frequency signal, wherein the code-clock signal is aligned with transitions in the multi-level code signal; multiplying the digital transmit data signal, the multi-level code signal, and the RF center frequency signal, and responsive thereto, generating a UWB signal to be transmitted as an output signal.

One or more embodiments provide that the multi-level code signal can be generated in response to a mask signal and a chipping code signal. Accordingly, the method can further comprises receiving a mask signal and a chipping code signal; and generating the multi-level code signal responsive to the chipping code signal and the mask signal.

One or more embodiments provide that the multi-level code signal, the RF center frequency signal, and/or the UWB signal can be differential, or single-ended, or any combination thereof. Accordingly, the method can further provide that at least one of the multi-level code signal, the RF center frequency signal, and the UWB signal is differential. Even where at least one such signal is differential, one or more of the other signals can be single-ended.

The multi-level code signal can be a signal having a plurality of distinct amplitude levels, such as binary, ternary, or n-ary. Accordingly, one or more embodiments provide that the multi-level code signal is ternary.

One or more embodiments optionally provides for differentially buffering the UWB signal after it is produced, but before it is provided to the transmit antenna. As explained above, differential buffering can reduce distortion including, e.g., spectral lines. Accordingly, the method can comprise differentially buffering the UWB signal to reduce distortion.

It should be noted that the term communication device may be used interchangeably herein with subscriber unit, wireless subscriber unit, wireless subscriber device, short range wireless device, a wireline device, or the like. Each of these terms denotes a device which is typically a wireless or wireline device, which optionally can be mobile, that may be used with a public network, for example in accordance with a service agreement, or within a private network such as an enterprise network. Examples of such units include personal digital assistants, personal assignment pads, and personal computers equipped for wireless operation, a cellular handset or device, digital cameras, portable and handheld digital electronic devices, or equivalents thereof provided such units are arranged and constructed for operation in connection with high speed data transmission.

The communication devices of particular interest are those providing or facilitating voice communications services or data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.15.3A, 802.16, 802.20 or Flarion, integrated digital enhanced networks and variants or evolutions thereof.

Furthermore the communication units or devices of interest may have short range communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the communication units or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An ultra wideband direct sequence code division multiple access (UWB DS-CDMA) transmitter, comprising:
   a first multiplier receiving two input signals, where the input signals are selected from a multi-level code signal, a transmit data signal, and a radio frequency (RF) center frequency signal, and responsive to the two input signals, generating a combined signal;
   a first network receiving a code-clock signal aligned with the multi-level signal, multiplying the frequency of the code-clock signal by a first factor, and responsive thereto, producing the RF center frequency signal;
   a second multiplier receiving the combined signal and the other of the input signals, and responsive thereto, generating an output signal; and a second network receiving the code-clock signal, multiplying the frequency of the code-clock signal by a second factor, and responsive thereto, producing a data-clock signal aligned with the transmit data signal.

2. The device of claim 1, wherein the first factor is three.

3. The device of claim 1, wherein the first network includes at least one of a frequency locked loop, a delay lock loop, a phase-locked loop, and an injection-locked oscillator.

4. The device of claim 1, wherein the second factor is one of ½, ⅓, ¼, ⅙, 1/12 and 1/24.

5. The device of claim 1, further comprising a multi-stage differential buffer having at least one stage in series receiving the output signal, and balancing the output signal to provide a balanced output signal.

6. The device of claim 1, further comprising a multi-level code generator, receiving a chipping code signal and a mask signal and responsive thereto, providing the multi-level code signal.

7. The device of claim 1, further comprising a power control feedback loop receiving the output signal, adjusting the magnitude of the output signal waveform, and outputting the adjusted output signal.

8. The device of claim 1, wherein at least one of the first multiplier and the second multiplier is differential; and at least one of the multi-level code signal and the combined signal is differential.

9. The device of claim 1, wherein the multi-level code signal is a ternary signal.

10. A method of generating an ultra wideband (UWB) output signal to be transmitted, comprising:
   receiving a multi-level code signal and a digital transmit data signal;
   multiplying a frequency of a code-clock signal by a first factor to produce a radio frequency (RF) center frequency signal, wherein the code-clock signal is aligned with transitions in the multi-level code signal;
   multiplying the frequency of the code-clock signal by a second factor, and responsive thereto, producing a data-clock signal aligned with the digital transmit data signal; and
   multiplying the digital transmit data signal, the multi-level code signal, and the RF center frequency signal, and responsive thereto, generating a UWB signal to be transmitted as an output signal.

11. The method of claim 10, further comprising: receiving a mask signal and a chipping code signal; and generating the multi-level code signal responsive to the chipping code signal and the mask signal.

12. The method of claim 10, wherein at least one of the multi-level code signal, the RF center frequency signal, and the UWB signal is differential.

13. The method of claim 10, further comprising differentially buffering the UWB signal to reduce distortion.

14. The method of claim 10, wherein the multi-level code signal is ternary.

15. A communication device for transmitting data, comprising:
   a processor, the processor being configured to facilitate providing a transmit data signal representative of data to be transmitted; and
   a transmitter, cooperatively operable with the processor and responsive to receipt of the transmit data signal, including
      a first network inputting a code-clock signal and multiplying a frequency of the code-clock signal by a first factor, to produce a radio frequency (RF) center frequency signal;
      a second network receiving the code-clock signal, multiplying the frequency of the code-clock signal by a second factor, and responsive thereto, producing a data-clock signal aligned with the transmit data signal;
      a first multiplier receiving two input signals, where the input signals are selected from a multi-level code signal, the transmit data signal, and the RF center frequency signal, and responsive to the two input signals, generating a combined signal; and
      a second multiplier receiving the combined signal and the other of the input signals, and responsive thereto, generating an ultra wide band (UWB) signal to be transmitted as an output signal.

16. The device of claim 15, further comprising a multi-stage differential buffer having at least one stage in series receiving the UWB signal to reduce distortion therein.

17. The device of claim 15, further comprising a multi-level code generator, receiving a chipping code signal and a mask signal and responsive thereto, providing the multi-level code signal.

18. The device of claim 15, wherein the multi-level code signal is ternary.

19. The device of claim 15, wherein at least one of the multi-level code signal, the RF center frequency signal, the combined signal, and the output signal is differential.

* * * * *